(12) United States Patent
Lee et al.

(10) Patent No.: US 8,979,302 B2
(45) Date of Patent: Mar. 17, 2015

(54) MULTIPLE WAVELENGTH LED ARRAY ILLUMINATOR FOR FLUORESCENCE MICROSCOPY

(71) Applicant: DiCon Fiberoptics, Inc., Richmond, CA (US)

(72) Inventors: Jeffrey B. Lee, El Sobrante, CA (US); Junying Jonathan Lu, Castro Valley, CA (US); Robert E. Schleicher, Danville, CA (US)

(73) Assignee: DiCon Fiberoptics Inc., Richmond, CA (US)

( * ) Notice: Subject to any disclaimer, the term of this patent is extended or adjusted under 35 U.S.C. 154(b) by 0 days.

(21) Appl. No.: 14/071,334

(22) Filed: Nov. 4, 2013

(65) Prior Publication Data

US 2014/0063797 A1    Mar. 6, 2014

Related U.S. Application Data

(63) Continuation of application No. 13/088,033, filed on Apr. 15, 2011, now Pat. No. 8,596,815.

(51) Int. Cl.
*G02B 21/06*    (2006.01)
*F21V 9/00*    (2006.01)
(Continued)

(52) U.S. Cl.
CPC . *F21V 9/00* (2013.01); *G02B 21/16* (2013.01); *G02B 26/008* (2013.01); *F21K 9/50* (2013.01)
USPC ...... 362/231; 362/233; 362/268; 362/249.02; 359/385

(58) Field of Classification Search
CPC .................................. G02B 21/16; F21K 9/56
USPC ....................... 362/231, 268, 249.02; 359/385
See application file for complete search history.

(56) References Cited

U.S. PATENT DOCUMENTS 4,519,020 A    5/1985 Little
4,739,456 A    4/1988 Little
(Continued)

OTHER PUBLICATIONS

Koninklijke Philips Electronics N.V., "Intellectual Property & Standards, Licensing Programs, LED-based Luminairies and Retrofit Bulbs", Nov. 11, 2010; www.ip.philips.com/services, 2 pages.
(Continued)

*Primary Examiner* — Anabel Ton
(74) *Attorney, Agent, or Firm* — Davis Wright Tremaine LLP

(57) ABSTRACT

One embodiment provides light along an optical axis. It comprises a substrate and at least one array of multiple LED chips without individual packaging supported by the substrate. The LED chips emit light within different wavelength ranges and are distributed laterally with respect to the axis over an area, the LED chips having light emitting surfaces for emitting light in directions transverse to the area. An optical element adjacent to the light emitting surfaces of the LED chips in the at least one array collects and directs light emitted by the LED chips of the at least one array along the axis towards a target. Another embodiment is directed to a method for providing multiple wavelength light for fluorescent microscopy using the above system. Electric current is supplied to the multiple LED chips, causing them to emit light of multiple wavelengths. The currents supplied to the multiple LED chips are controlled so as to control the exposure of fluorescent dyes with different excitation wavelengths wherein the light emitted by the multiple LED chips include wavelength components at such different excitation wavelengths without having to move the multiple LED chips.

10 Claims, 11 Drawing Sheets

(51) Int. Cl.
  *G02B 21/16* (2006.01)
  *G02B 26/00* (2006.01)
  *F21K 99/00* (2010.01)

(56) References Cited

U.S. PATENT DOCUMENTS

| | | | |
|---|---|---|---|
| 4,843,528 | A | 6/1989 | Pearce-Harvey et al. |
| 5,012,609 | A | 5/1991 | Ignatius et al. |
| 5,165,778 | A | 11/1992 | Matthias et al. |
| 5,235,499 | A | 8/1993 | Bertenshaw |
| 5,687,062 | A | 11/1997 | Larson |
| 5,715,040 | A | 2/1998 | Iba |
| 6,092,914 | A | 7/2000 | Esakoff et al. |
| 6,504,301 | B1 | 1/2003 | Lowery |
| 6,554,450 | B2 | 4/2003 | Fang et al. |
| 6,659,622 | B2 | 12/2003 | Katogi et al. |
| 6,809,347 | B2 | 10/2004 | Tasch et al. |
| 6,860,619 | B2 | 3/2005 | Swanson |
| 6,866,401 | B2 | 3/2005 | Sommers et al. |
| 6,921,182 | B2 | 7/2005 | Anderson et al. |
| 7,140,751 | B2 | 11/2006 | Lin |
| 7,173,383 | B2 | 2/2007 | Vornsand et al. |
| 7,192,162 | B2 | 3/2007 | Tanaka et al. |
| 7,220,018 | B2 | 5/2007 | Crabb et al. |
| 7,261,438 | B2 | 8/2007 | Alessio |
| 7,295,379 | B2 | 11/2007 | Tsai |
| 7,543,952 | B1 | 6/2009 | Chang |
| 7,549,772 | B2 | 6/2009 | Wang |
| 7,670,030 | B2 | 3/2010 | Klipstein |
| 7,676,915 | B2 | 3/2010 | Ter-Hovhannissian |
| 7,722,211 | B2 | 5/2010 | Marra et al. |
| 7,771,088 | B2 | 8/2010 | Chen |
| 7,893,445 | B2 | 2/2011 | van de Ven et al. |
| 8,038,319 | B2 | 10/2011 | Bailey |
| 8,044,427 | B2 | 10/2011 | Su et al. |
| 8,047,684 | B2 | 11/2011 | Chang |
| 8,057,060 | B2 | 11/2011 | Fredricks |
| 8,508,127 | B2 | 8/2013 | Negley et al. |
| 8,523,385 | B2 | 9/2013 | Lu et al. |
| 8,568,009 | B2 | 10/2013 | Chiang et al. |
| 8,596,815 | B2 | 12/2013 | Lee et al. |
| 2005/0152146 | A1 | 7/2005 | Owen et al. |
| 2005/0237747 | A1 | 10/2005 | Shimizu et al. |
| 2007/0058368 | A1 | 3/2007 | Partee et al. |
| 2007/0253196 | A1 | 11/2007 | Ormiston |
| 2008/0218995 | A1 | 9/2008 | Gilkey et al. |
| 2009/0080184 | A1 | 3/2009 | Kobilke |
| 2009/0190363 | A1 | 7/2009 | McDonnell et al. |
| 2009/0201577 | A1* | 8/2009 | LaPlante et al. ............ 359/355 |
| 2009/0288340 | A1 | 11/2009 | Hess |
| 2009/0315062 | A1 | 12/2009 | Su et al. |
| 2010/0033970 | A1 | 2/2010 | Jetter et al. |
| 2010/0188018 | A1 | 7/2010 | Salm |
| 2011/0050126 | A1 | 3/2011 | Wang et al. |
| 2012/0044713 | A1 | 2/2012 | Chiang et al. |

OTHER PUBLICATIONS

Koninklijke Philips Electronics N.V., "Philips Color Kinetics Core LED Lighting Technologies", Nov. 11, 2010; www.colorkinetics.com/technologies/core, 2 pages.
U.S. Office Action for U.S. Appl. No. 12/860,760 mailed Sep. 27, 2012, 21 pages.
U.S. Final Office Action for U.S. Appl. No. 12/860,760 mailed Dec. 17, 2012, 23 pages.
Notice of Allowance and Fees Due for U.S. Appl. No. 12/860,760 mailed Jun. 24, 2013, 9 pages.
U.S. Office Action for U.S. Appl. No. 13/216,085 mailed Nov. 28, 2012, 27 pages.
U.S. Final Office Action for U.S. Appl. No. 13/216,085 mailed Apr. 3, 2013, 25 pages.
U.S. Office Action for U.S. Appl. No. 13/023,445 mailed Mar. 15, 2013, 29 pages.
Notice of Allowance and Fees Due for U.S. Appl. No. 13/023,445 mailed Aug. 6, 2013, 9 pages.
Notice of Allowance and Fees Due for U.S. Appl. No. 13/216,085 mailed Nov. 7, 2014, 8 pages.
U.S. Office Action for U.S. Appl. No. 13/756,282 mailed Nov. 20, 2014, 7 pages.
U.S. Final Office Action for U.S. Appl. No. 13/216,085 mailed May 14, 2014, 27 pages.
U.S. Office Action for U.S. Appl. No. 13/088,033 mailed May 22, 2013, 10 pages.
Notice of Allowance and Fees Due for U.S. Appl. No. 13/088,033 mailed Sep. 18, 2013, 13 pages.
U.S. Office Action for U.S. Appl. No. 13/216,085 mailed Sep. 9, 2013, 23 pages.

* cited by examiner

POLAR CANDELA DISTRIBUTION PLOT

MULTIPLE WAVELENGTH LED ARRAY ILLUMINATOR FOR FLUORESCENCE MICROSCOPY

BACKGROUND

The present invention relates generally to illumination apparatuses used for purposes such as fluorescence microscopy, and specifically to an illumination apparatus comprising a multiple wavelength light emitting diode (LED) array and its accompanying optical elements.

Fluorescence microscopy is popularly used in numerous bio/medical applications since it enables users to label and observe specific structures or molecules. Briefly, fluorescence is a chemical process where when light of a specific wavelength is shined upon a fluorescent molecule, electrons are excited to a high energy state in a process known as excitation. These electrons remain briefly in this high energy state, for roughly a nanosecond, before dropping back to a low energy state and emitting light of a lower wavelength. This process is referred to as fluorescent emission, or alternatively as fluorescence.

In a typical fluorescence microscopy application, one or more types of fluorescent materials or molecules (sometimes referred to as fluorescent dyes) are used, along with an illuminator apparatus that provides the exciting wavelength, or wavelengths. Different fluorescent molecules can be selected to have visually different emission spectra. Since different fluorescent molecules typically have different excitation wavelengths, they can be selectively excited so long as the bandwidth of the excitation light for one fluorescent molecule does not overlap the excitation wavelengths of other fluorescent molecules that are being used in the same experiment. Therefore the excitation light should ideally have a narrow bandwidth and have its peak output at the excitation wavelength of the molecule in question. Furthermore, fluorescence is a probabilistic event with low signal levels so an intense light is typically used to increase the chances of the process occurring. Most fluorescence microscopy applications also benefit from having a uniformly intense illuminated field of view or area, ideally such that the size and shape of the illuminated area can be modified. Simultaneously achieving all these criteria has been difficult but is necessary for current and future applications that require increasing levels of illumination control and consistency.

Traditional prior art fluorescence microscopy illuminators have relied on metal halide arc lamp bulbs such as Xenon or Mercury bulbs, as light sources. The broad wavelength spectrum produced by these lamps when combined with specific color or band pass filters allows for the selection of different illumination wavelengths. This wavelength selection and light shaping process, however, is highly energy inefficient since in selecting only a relatively small portion of wavelength spectrum produced by the Xenon or Mercury bulb, the vast majority of the light outputted from the lamp is unused. These wavelength selection or band pass filters are costly, especially when placed on a mechanical rotating wheel in typical multiple-wavelength applications.

In this type of implementation using metal halide arc lamp bulbs, the speed with which different wavelengths can be selected is limited by the mechanical motion of moving various filters into place. In addition to the sluggishness and unreliability of filter wheels, as well as energy coupling inefficiency, metal halide arc lamps are also hampered by the limited lifetime of the bulb, typically ~2000 hours. The intensity of the light output declines with bulb use and once exhausted, the user has to undergo a complicated and expensive process of replacing the bulb and subsequently realigning the optics without any guarantee that the illuminator will perform as before. These disadvantages make acquiring consistent results difficult and inconvenient for users who must deal with the variable output of the bulbs, and who must either be trained in optical alignment or call upon professionals when a bulb needs to be replaced.

In recent years, several prior art multiple wavelength illuminators have been developed using different colored LEDs as light sources, that overcome numerous limitations of metal halide arc lamps. Not only do they last longer, with the lifetime of an LED chip being typically rated at well over 10,000 hours, but in addition the power output varies negligibly over that period. Furthermore, the bandwidth of the spectral output of an LED chip is typically narrow (<30 nm) which can eliminate the need for additional band pass filters and is ideal for fluorescence applications. The intensity of the output light can be quickly and accurately controlled electronically by varying the current through the LED chip(s), whereas in metal halide illuminators, the output intensity of the bulb is constant and apertures or neutral density filters are used to attenuate the light entering the microscopy.

Prior art LED illuminators for fluorescence microscopy have thus far used up to 5 separate LED modules, each containing one up to a few chips, for each wavelength. Since the LED chips in these modules have their own individual packaging, the modules are large so that light beams emitted from the modules will need to be combined using optical elements. Although such prior art LED illuminators allow the user the flexibility to swap out modules for new modules with different wavelengths, the additional elements such as lenses, mirrors and heat sinks required for each separate color add complexity, bulk and cost. Furthermore, the long optical paths required to combine the beams from multiple LED chips or modules that are spatially separated, make it difficult to collect and shape already highly divergent light coming from the LED chips. These practical issues have limited the application of such illuminators in fluorescence microscopy, which in general requires light that is both intense and spatially uniform.

SUMMARY OF THE INVENTION

One embodiment of the invention is directed to a multiple wavelength LED array illuminator for providing light along an optical axis, which comprises a substrate and at least one array of multiple LED chips without individual packaging supported by the substrate, wherein the LED chips emit light within different wavelength ranges and are distributed laterally with respect to the axis over an area, the LED chips having light emitting surfaces for emitting light in directions transverse to the area. The illuminator includes an optical element adjacent to the light emitting surfaces of the LED chips in the at least one array that collects and directs light emitted by the LED chips of the at least one array along the axis towards a target. Additional optical elements, including a light collecting lens of preferably large numerical aperture, a light scrambler or homogenizer, an aperture, and a focusing or collimating lens of preferably large aperture and diameter, serve to create a collimated (or nearly collimated) beam of preferably high spatial uniformity, that is directed into the target microscope.

Another embodiment is directed to a method for providing multiple wavelength light for fluorescent microscopy. A LED array illuminator is provided that includes a substrate, at least one array of multiple LED chips without individual packaging supported by the substrate, wherein the LED chips emit light within different wavelength ranges. Electric current is supplied to the multiple LED chips, causing them to emit light of multiple wavelengths.

The currents supplied to the multiple LED chips are controlled so as to control the exposure of fluorescent dyes with different excitation wavelengths wherein the light emitted by the multiple LED chips includes wavelength components at such different excitation wavelengths without having to move the multiple LED chips.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

Identical components in this application are labeled by the same numerals.

DETAILED DESCRIPTIONS OF THE PREFERRED EMBODIMENTS

Figure 1:
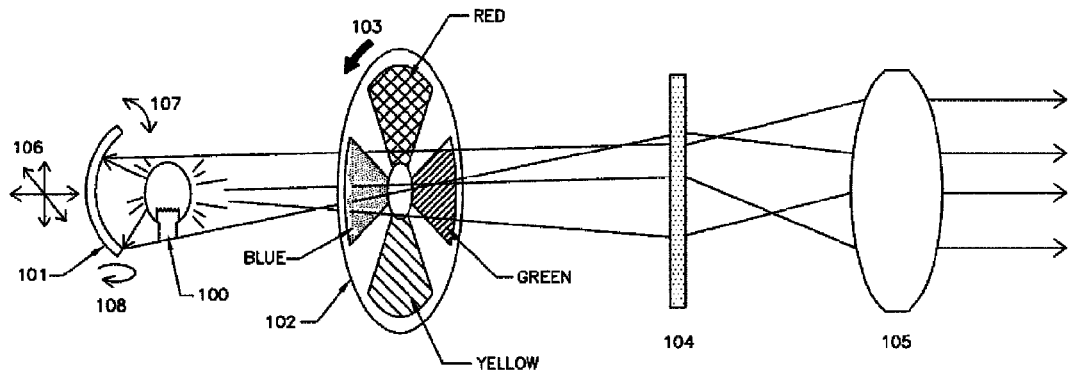
FIG. 1 is a representation of the prior art of a typical multiple wavelength fluorescence microscopy illuminator using a Xenon or Mercury lamp and color filter wheel to select the wavelength.

A compact multiple wavelength illuminating apparatus is disclosed herein, comprising one or more LED array with accompanying optical elements that outputs intense, spectrally narrow light uniformly over a field of view. The LED array contains multiple strings, each string comprising several LED chips of the same wavelength, where the wavelength of each string is preferably different from wavelengths of the other strings, with each string controlled electronically as a separate channel. Alternatively, each string may comprise LED chips that emit different wavelengths, where the group of wavelengths emitted by each string is different from the groups of wavelengths emitted by the other strings, and where there can be overlap between the groups of wavelengths emitted by the different strings.

Several major advantages result from the use of an LED array that contains LED chips of multiple wavelengths, organized into separately controlled strings. Multiple exciting wavelengths supplied simultaneously enable the selective excitation of multiple fluorescent molecules or dyes, within the same experiment. It may also avoid the need to change out the light sources when multiple researchers are using the same equipment for their experiments, but are using different fluorescent molecules or dyes. The multiple channels allow for each string of LEDs and hence output color and power to be rapidly switched on/off and varied in intensity, respectively.

The optical elements immediately succeeding the LED array serve to collect and reshape the output light to enhance both light coupling efficiency and uniformity. A lens attached to the surface of the LED array enhances light extraction, and is followed by another lens of large numerical aperture, that is used to collect the light and send it through a light scrambler which acts to spatially homogenize the beam. An aperture, used to cut off undesired light on the perimeter of the beam, is followed by a focusing or collimating lens of large aperture and diameter, after which the light either enters a microscope or additional optical elements such as fiber couplers or beam expanders for additional light shaping. The apparatus allows for minor adjustments to be made in the positioning of the optical elements along the optical axis, to compensate for optical differences between different brands of microscopes. Furthermore, translational lateral movement of the array enables different regions of the LED chip array to be aligned along the optical axis to enhance optical performance. Interchangeable mounting adapters allow the apparatus to be used with multiple brands of microscopes. The resulting illuminating beam, with high brightness and a high degree of uniformity, ensures that the fluorescence of samples within the beam is consistent and repeatable.

As fluorescence microscopy becomes increasingly popular in bio/medical applications the demand for powerful, reliable, and affordable illumination sources has increased as well. Fluorescence microscopy has evolved as a tool not only for viewing specific structures, but for quantitatively measuring their distribution and dynamics as well. These quantitative measurements benefit from illumination sources that are stable over long periods of time and will last at least the lifetime of the experiment or project. To increase time resolution, faster exposure times are being used which typically requires a stronger excitation signal and hence intense illumination. Furthermore, to simplify background calibrations, the illumination area, which can be larger than the microscope's field of view, should be uniform in intensity. Simultaneously achieving all the above features of an ideal fluorescence illuminator has been thus far either exceedingly difficult and/or expensive. The present invention overcomes several of the disadvantages of prior art multiple wavelength fluorescence microscopy illuminators and satisfies the needs for many fluorescence applications.

Although multiple wavelength illuminators have been realized using traditional metal halide arc lamps with selective filters, this technology has been limited mainly by the inherent widespread spectral distribution of the lamps. Metal halide fluorescent microscopy illuminators work by filtering out unwanted wavelengths, but because the power of the light source is distributed over a wide range of wavelengths, only a small fraction of it goes into the desired filtered wavelength. Thus metal halide illuminators are often considered to be underpowered. The need for mechanical filter wheels also makes switching colors relatively slow, typically a fraction of a second, when compared to the sub-microsecond time scale of turning LEDs on and off.

A typical carousel filter wheel is shown in FIG. 1, as item 102, with its direction of rotation indicated by item 103. Since the lamp filament in metal halide arc lamp bulb 100 which emits light is an extended light source, significant optical treatment must be done to make the illumination area uniform. This typically involves either using dispersive diffusers (FIG. 1, item 104) or field stops and apertures (not shown) for Koehler illumination, for instance, both of which cut even more power. Lastly metal halide arc lamps are hampered by the short lifetime of the bulbs, over which lifetime the intensity continually decays. Most lamps require a warm-up period of around 30 minutes which can be inconvenient for users with time sensitive samples. Rated to last roughly a few hundred hours, bulbs must often be replaced several times a year which is not only inconvenient and expensive, but difficult and often requires the hiring of professionals. Alignment typically requires adjusting the many degrees of freedom of a reflector surrounding the bulb (FIG. 1, item 101, adjustment along arrows 107, and 108) which is not necessarily a tedious process, but often requires training and is hence inaccessible to many users unfamiliar with optics.

Prior art multiple wavelength LED illuminators have overcome some of the limitations of metal halide ones but have been complicated, requiring many optical elements, and hence costly to manufacture. LEDs emit light with narrow bandwidth (typically ~10-30 nm for a specific LED chip), ideal for most fluorescence applications. Unlike metal halide bulbs, LED chips have lifetimes rated at well over 10,000 hours and do not require a warm up period before reaching full output. The ability to have multiple wavelengths is achieved by using LED chips that emit different colors. Each LED chip resembles a point source more than metal halide bulbs do and therefore it is usually easier to homogenize the illumination intensity distribution.

Figure 2:
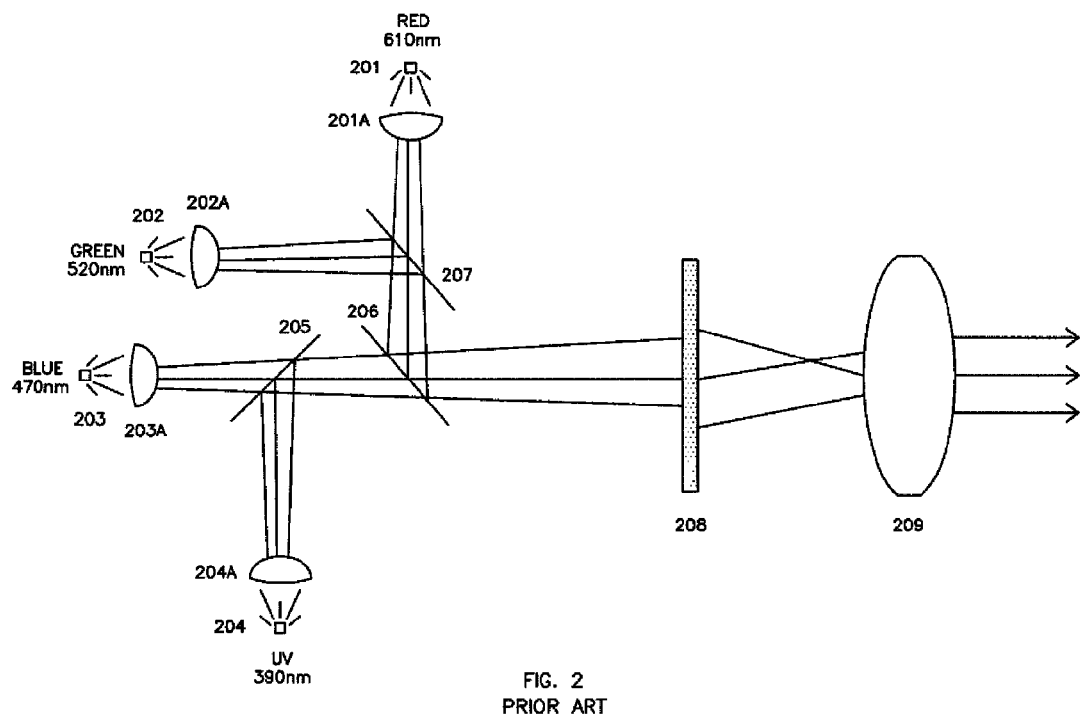
FIG. 2 is a representation of the prior art in multiple wavelength fluorescence microscopy LED illuminators using separate LED modules for each different wavelength.

In the prior art embodiment shown in FIG. 2, each wavelength comes from separate LED "modules" (FIG. 2, items 201-204). Since prior art LEDs each has its own packaging, the LED modules are relatively large, so that each module will need to have its own set of collecting and collimating optics (items 201A-204A), whose light paths are combined using dichroic mirrors (items 205-207). Having separate modules, however, requires long optical paths. In order to collect the maximum amount of light, this prior art embodiment requires large lenses with large numerical apertures that are both costly and bulky. The maximum number of LED wavelengths that can be equipped at any one time is also limited by the cost and complexity of the beam-combining optics.

The present invention of a multiple wavelength fluorescence illumination apparatus uses a densely packed LED chip array, where the LED chips do not have individual packaging to allow dense packing of the chips in the array, and is both compact and uses far fewer optical elements than the prior art LED illuminators which use modules. The LED chips in the array are preferably supported on a single substrate and the array has a single package for housing all of the chips in the array, resulting in a module with multiple LED chips. The dimensions of the light emitting area of the LED array are less than 25 mm, and are typically in the range of 8-15 mm. The light emitting area of the LED array is preferably circular in shape and has a diameter less than 25 mm and typically in the range of 8-15 mm. The number of wavelengths provided within the array depends on the specific design of the LED array, and on the needs and requirements of the users of the illuminator apparatus. A typical embodiment of the present invention would include at least four wavelengths of LEDs, and might include as many as 8, 10, or even 12 wavelengths. Including more wavelengths within a single LED array gives the users of the apparatus more choices of fluorescent molecules or dyes to use in their experiments. This may be important in environments where multiple users are sharing equipment. The multiple wavelengths, or a subset of them, may also be used simultaneously, in experiments that require the use of multiple, selectively-excited fluorescent dyes.

Figure 3:
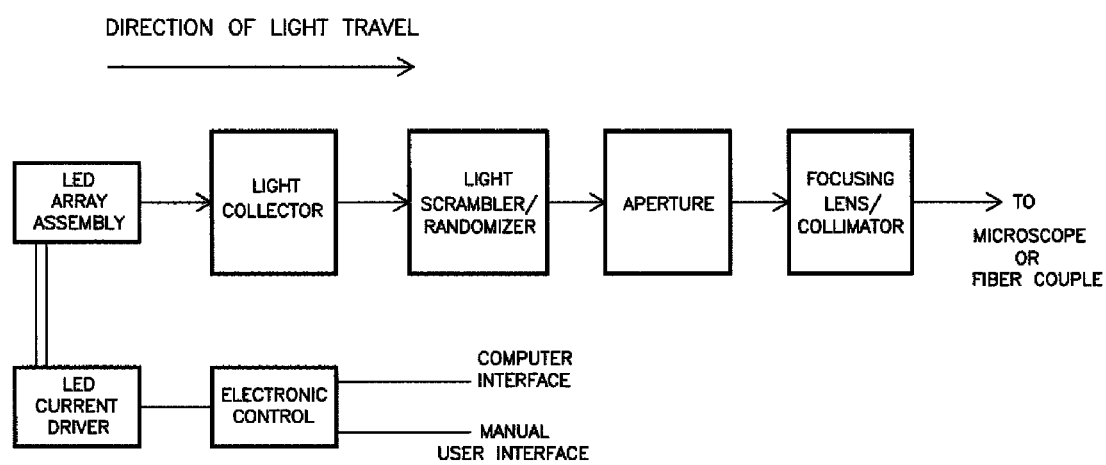
FIG. 3 is a block diagram representation of the present invention and illustrates the different components and their function in the apparatus.
Figure 4A:
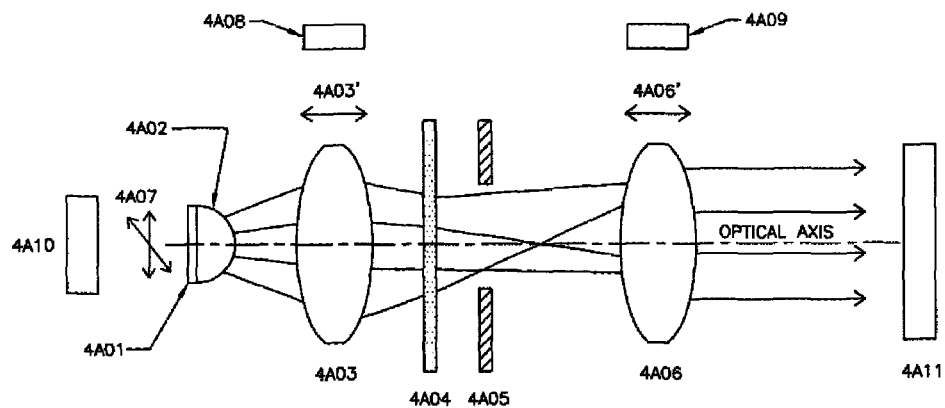
FIG. 4A is a representation of one embodiment of the present invention using a diffuser plate as a light scrambler/randomizer.

A schematic block diagram illustrating the major components in the apparatus of one embodiment of the present invention is shown in FIG. 3, with the optical elements of one implementation of the embodiment shown in more detail in FIG. 4A. The light emitted from the LED chips within the LED array assembly has a Lambertian distribution. Since the index of refraction of the chips is high (3.4 for GaAs-based LED chips, and 2.3 for GaN-based LED chips), a lens such as a half-ball lens (item 4A02) is attached to the top of the LED array (item 4A01) with a refractive index matching gel such as silicone filling the space between the LED chips and the half-ball lens, to reduce total reflection at the LED surfaces and improve light extraction. The diverging light from the LED array is then immediately collected by a condensing lens (item 4A03) of high numerical aperture (small f-number). Afterwards, the light is homogenized using a light scrambler/randomizer (item 4A04) and aperture (item 4A05) such that the intensity distribution is uniform over the illuminated area entering the microscope.

The light scrambler (item 4A04) can be any kind of material that evenly distributes light, for instance by having randomly textured surfaces or imbedded diffractive particles. In one embodiment of the present invention, an engineered diffuser is used, that provides a non-Gaussian, circular "top-hat" beam pattern, with a flatter beam intensity profile than would be obtained from a traditional diffuser. This form of diffuser aids in achieving a highly uniform beam pattern. Said "top-hat" diffusers are available from multiple vendors, and achieve their shaped beam profile, with a high degree of beam uniformity, through the use of an engineered surface, consisting of a large number of microlenses. These microlenses are fabricated with a known pattern to create the desired overall beam shape, but the parameters of the individual microlenses are randomized in order to create a diffuse beam that is relatively insensitive to the spatial characteristics of the input beam. These engineered diffusers are available in a variety of beam shapes, including beams with circular, square and line-shaped cross-sections, all with good uniformity. The type used in one embodiment of the present invention provides a beam with a circular cross-section.

Figure 4B:
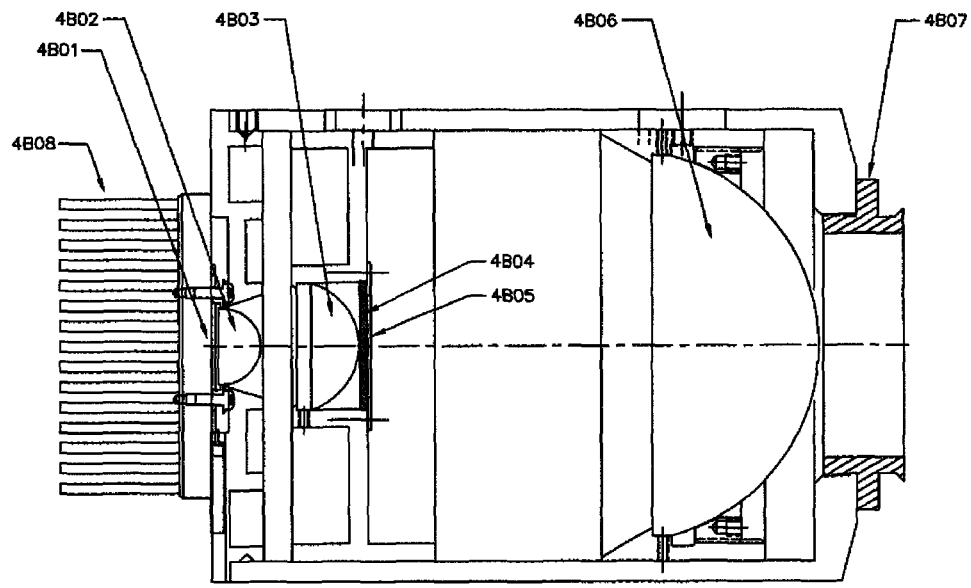
FIG. 4B shows a cross-section view of the optical elements of one practical implementation of one embodiment of the present invention.

A focusing lens/collimator of relatively large aperture and diameter (item 4A06) is placed at the end of the light path before entering the target microscope, represented in FIG. 4A by item 4A11. Though not described in detail, other kinds of lenses that improve light extraction, collection, and collimation are within the scope of the present invention. FIG. 4B provides a cross-section view of the optical elements of one embodiment of the present invention in which a plano-convex lens (item 4B03) and diffuser plate (item 4B04) are used as the light collector and scrambler, respectively. In the embodiment shown in FIGS. 4A and 4B, the positions of both the light collector lens (items 4A03 and 4B03) and the focusing lens/collimator (items 4A06 and 4B06) can be adjusted slightly (along arrows 4A03' and 4A06') along the optical axis, by means known to those in the art, such as by means of sliding lens mounts or lens holders. Note that in the embodiment shown in FIG. 4B, the adjustment of the light collector lens (4B03) also moves the diffuser plate (4B04) and aperture (4B05), which in this embodiment are fixed in relation to the light collector lens (4B03). The adjustability of the lenses is used to optimize the optical performance of the apparatus, to work with different brands of fluorescence microscopes. The adjustment may be performed using adjustment mechanisms 4A08 and 4A09 in a known manner. Although separate adjustment mechanisms are shown in FIG. 4A, it is within the scope of the present invention to have a single adjustment mechanism. Note that items 4B01 through 4B06 of FIG. 4B correspond to the similarly numbered items 4A01 through 4A06 of FIG. 4A. The focusing lens/collimator (4A06 and 4B06) forms and collimates the beam towards a target (not shown) in fluorescence microscopy. In addition, FIG. 4B shows a representative mounting adaptor (4B07), used to mount the illuminating apparatus to the microscope (not shown). It also shows a heat spreader and heat sink (4B08) mounted to the back side of the LED array (4B01).

Figure 5A:
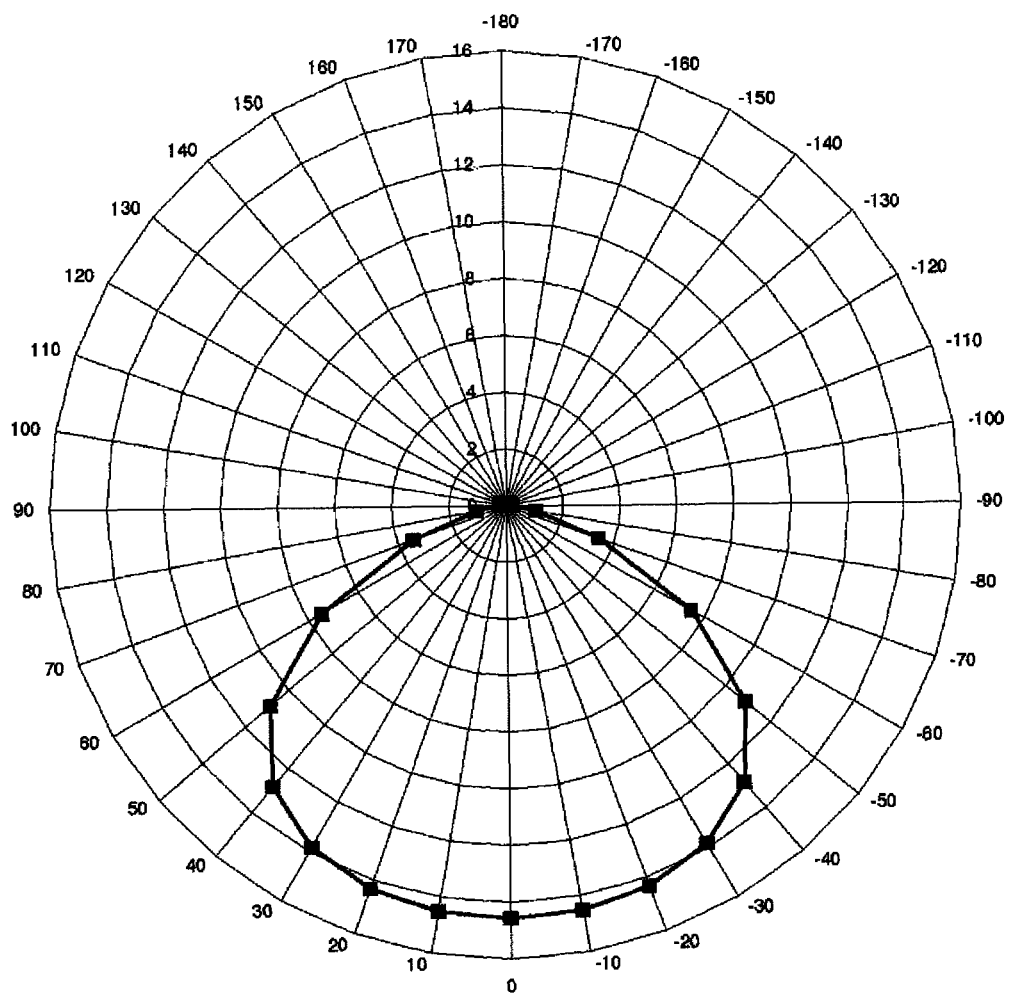
FIGS. 5A and 5B show polar and rectangular coordinate plots of the light output of the LED array used in one embodiment of the present invention, including the half-ball lens that sits over the LED array.
Figure 5B:
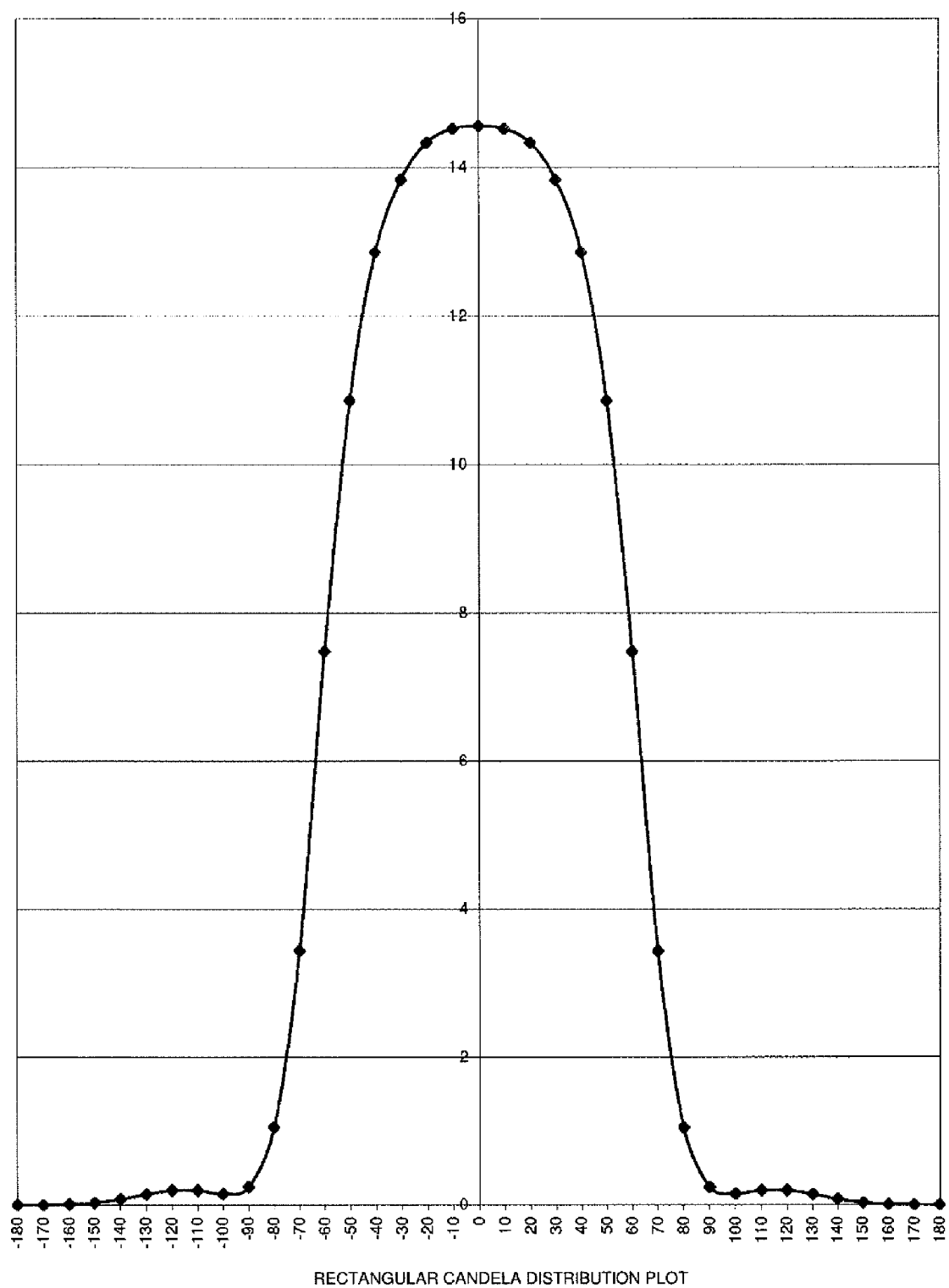
Figure 5C:
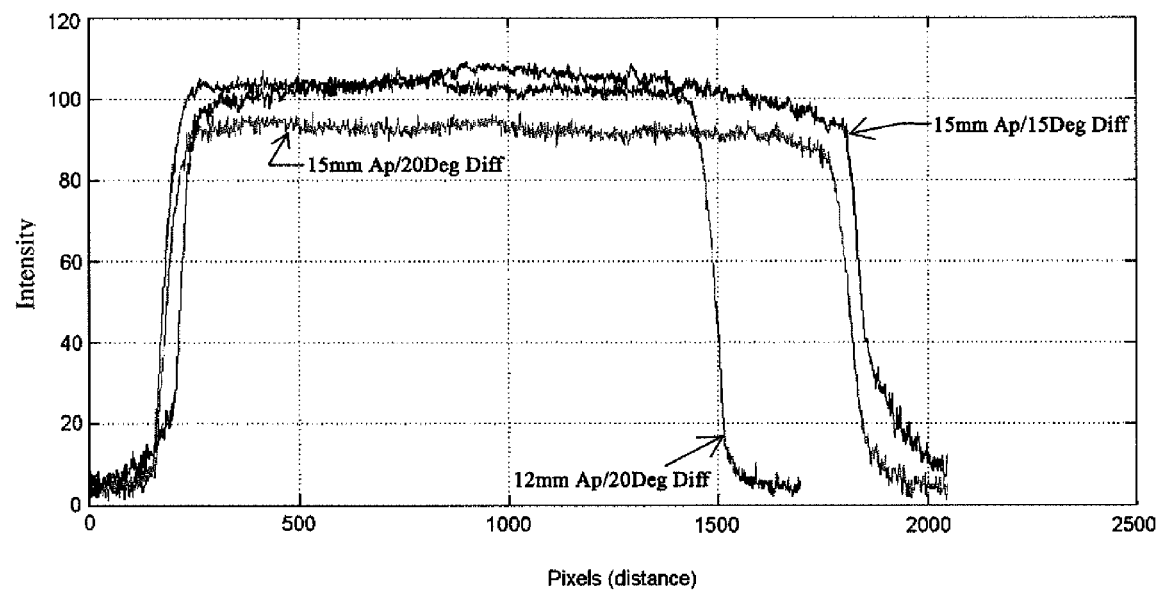
FIG. 5C provides plots of the light uniformity of the beam that exits the optical elements of one embodiment of the present invention, showing the relative effects of different aperture dimensions and different diffusers.

FIGS. 5A and 5B provide polar and rectangular coordinate plots of the light output of the LED array used in one embodiment of the present invention, including the effect on the light output of the half-ball lens that is affixed to the surface of the LED array. As can be seen in these figures, the LED array and half-ball lens provide a fairly wide beam, but with insufficient uniformity of light intensity across the beam. In contrast, FIG. 5C shows several plots of the light intensity across the beam that is emitted from the entire apparatus of one embodiment of the present invention, where a "top-hat" type diffuser is used. The three plots of FIG. 5C represent differing combinations of aperture diameter and the angle of the diffuser element. As expected the plot obtained with an aperture of 12 mm diameter shows a narrower beam, compared to the plots taken with an aperture of 15 mm. But in all cases, the beam is highly uniform, with sharply-defined beam boundaries.

The optics of the present invention are optimized to work with a point source, with light output that is aligned with the optical axis, whereas the actual LED array, though densely packed, is more of an quasi-extended point source. If a fixed position of the LED array does not provide sufficient light uniformity for all of the different wavelengths provided within the LED array, then it is possible to incorporate a movable mount (not shown) for the LED array, where the movement of the mount is caused by an adjustment mechanism 4A10, used in a known manner, such as x-axis and y-axis position adjustment screws, for translational motion along arrows 4A07. Using such a mount, the array can be positioned or translated, and the LED chips on the array can be arranged, such that the LED array, or the illuminated portion of the LED array, behave similarly to a point source. For many applications the different colors or wavelengths of LED chips within the array will all be located close enough to the optical axis (e.g. LED chips located less than about 10 or 15 mm from the optical axis) such that sufficient uniformity of the light output will be obtained, without movement or translation of the array, regardless of which color or wavelength is selected, and therefore regardless of which subset of LED chips within the array is illuminated.

However, where maximum uniformity of the light output is required, the position of the LED array can be laterally moved or translated to better align different regions of the LED array with the optical elements of the illuminator and to improve optical performance, since the optics are optimized for point sources along the optical axis. The translational degrees of freedom shown by FIG. 4A, motion along arrows 4A07 allow different regions of the LED array to be aligned with the optical axis. These degrees of freedom are represented in more detail by items 6A01 and 6A02 in FIG. 6A, which represents one embodiment of the LED chip array, where the LED chips supported by a common substrate (e.g. printed circuit board) are grouped into four subsets each emitting one of four wavelengths (390 nm, 470 nm, 520 nm and 610 nm in this example). For some applications, preferably the wavelengths emitted by the LED chips includes one in the ultraviolet range. Other wavelengths may be used, depending on the requirements of the fluorescent dyes that are to be excited. The array is arranged such that each wavelength of LED chip emitted from one of the four subsets is densely clustered in one of the four different regions of the array where the subset of LED chips in each of these regions can be aligned with the optical axis. FIG. 6B illustrates another embodiment in which the LED array apparatus contains several arrays side-by-side supported by a common substrate (e.g. printed circuit board), each array equipped with its own half-ball lens, and also uses translation (as represented by items 6B01 and 6B02) of the position of the arrays, such that different regions and/or arrays are aligned with the optical axis. Each of the four arrays of LED chips may emit light within a wavelength range that is different from those of light emitted by at least one of the remaining three arrays.

Figure 6A:
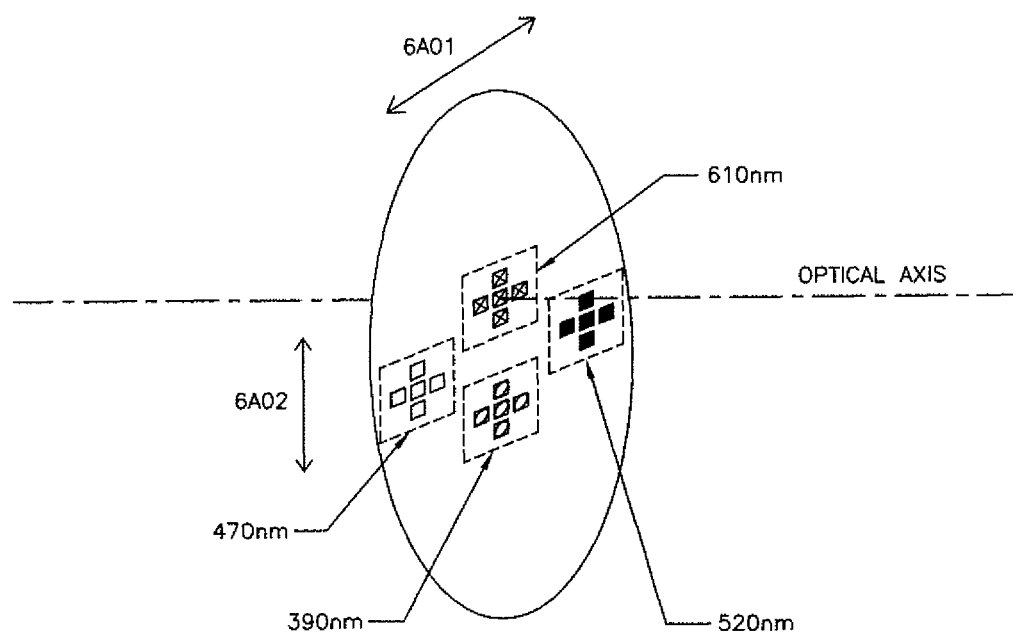
FIG. 6A is a perspective view of one embodiment of the LED array assembly from the present invention where lateral translation of the array enables different regions of the array to be aligned with the optical axis (shown in isometric view).
Figure 6B:
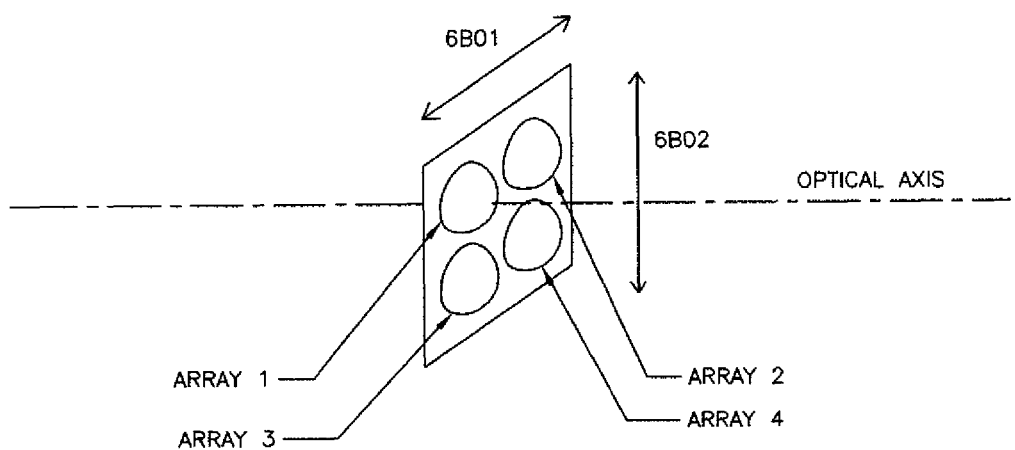
FIG. 6B is another perspective view of one embodiment of the LED array assembly in which several LED arrays each having its own lens are arranged in close proximity and lateral translation enables different arrays to be aligned with the optical axis (shown in isometric view).

While FIG. 6A illustrates an embodiment where each subset of LED chips emits the same wavelength. It will be understood, however, that this is not required. There may be applications where it is desirable for the light supplied to the microscope have different wavelengths for exciting different fluorescent dyes. For this purpose, it may be desirable for any one of the four subsets in FIG. 6A to contain LED chips that emit different wavelength light, to supply light to the microscope having different wavelengths for exciting different fluorescent dyes in the same experiment without having to move the LED chips at all.

Where certain combinations of wavelengths are particularly useful and are used frequently, these light of these wavelength combinations may be supplied by choosing the appropriate LED chips in each of the four subsets that emit such combination of wavelengths, even though some wavelengths may be emitted by more than one subset. Thus, each of the four subsets of LED chips may emit light within a plurality of wavelength ranges that are different from those of light emitted by at least one other of the remaining four subsets.

Figure 7A:
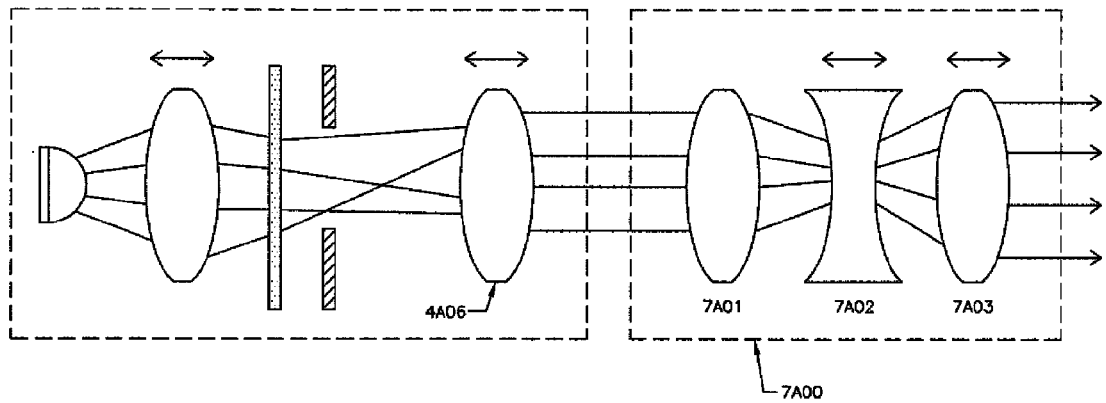
FIG. 7A is a schematic view of one embodiment where the light coming from the embodiment in FIG. 4 is sent into a zoom lens system to expand or contract the beam width.
Figure 7B:
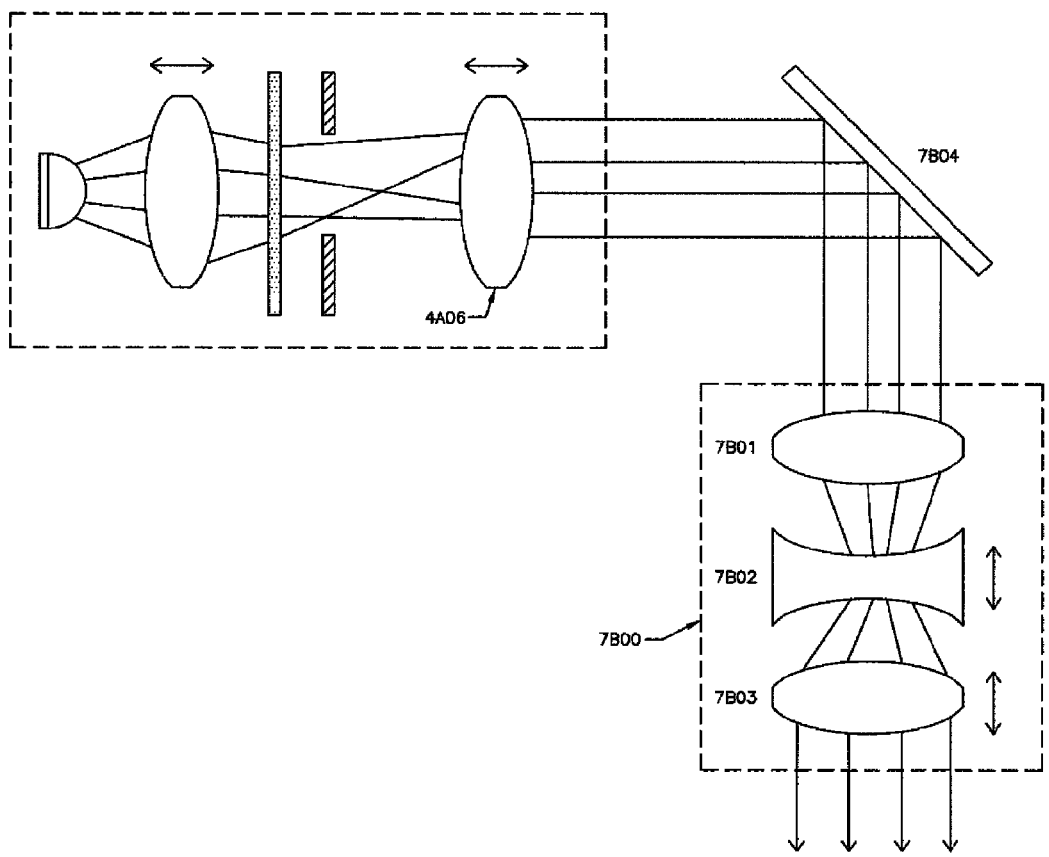
FIG. 7B is a schematic view of another embodiment where a mirror is placed between the embodiment in FIG. 4 and zoom lens system shown in FIG. 7A to redirect the light path.

The described embodiments of the present invention produce an intense and uniformly illuminated area which can be either sent directly into the microscope or to other optical elements for further beam shaping. FIG. 7A illustrates one embodiment in which a beam expander 7A00 (with optical components such as lenses 7A01-7A03) is placed in the optical path after the collimating/focusing lens 4A06. FIG. 7B illustrates the same embodiment of the apparatus except that a mirror (item 7B04) is placed between the collimating lens/focusing lens 4A06 and beam expander 7B00 to change the geometry of the light path, which may make packaging more convenient and compact. Although not shown in any of the figures except for FIG. 4B, the apparatus of the present invention can be fitted with a variety of mounting adapters, intended to mate mechanically with the optical ports of multiple brands of microscopes.

Figure 8:
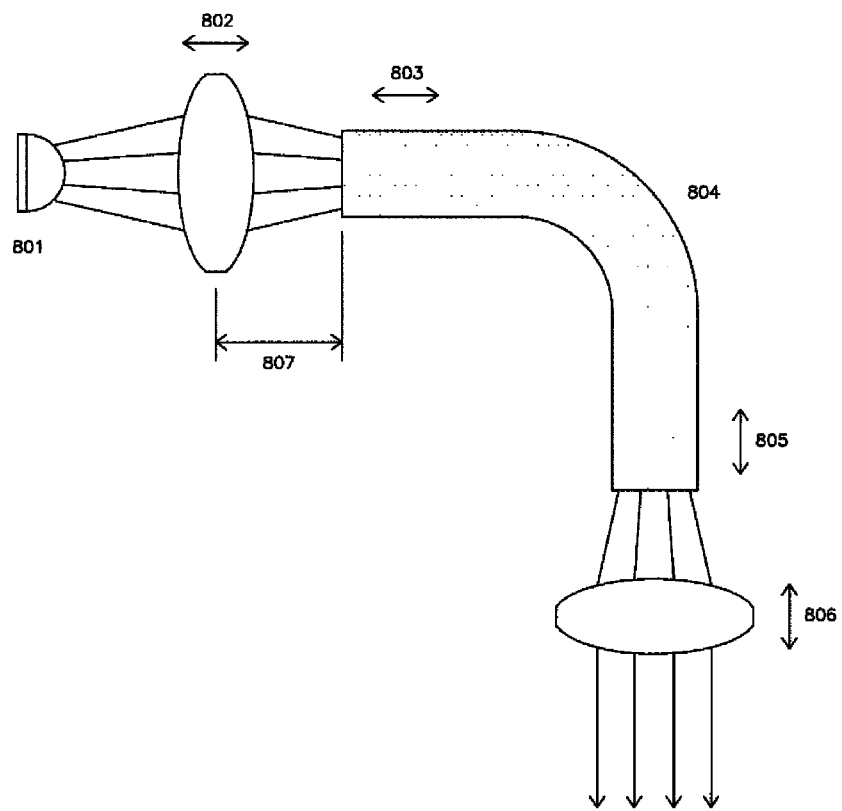
FIG. 8 is a schematic view of yet another embodiment of the present invention, using a light mixing tube as a light scrambler/randomizer and the variable distance between the collector lens and tube entrance as a means to change aperture size.

FIG. 8 illustrates one embodiment of the present invention using a light mixing tube as a light scrambler/randomizer, and makes use of a variable distance between the collector lens and tube entrance as a means of changing the effective aperture size. The light mixing tube (item 804), typically constructed of acrylic with many small diffractive particles embedded, can be used in place of the diffuser and aperture shown in FIGS. 4A and 4B. Similar to a fiber, the separation distance (shown as item 807) between the collecting lens (item 802) and light mixing tube, determines the accepting angle of the mixing tube and hence acts like a variable aperture that can be adjusted.

Figure 10:
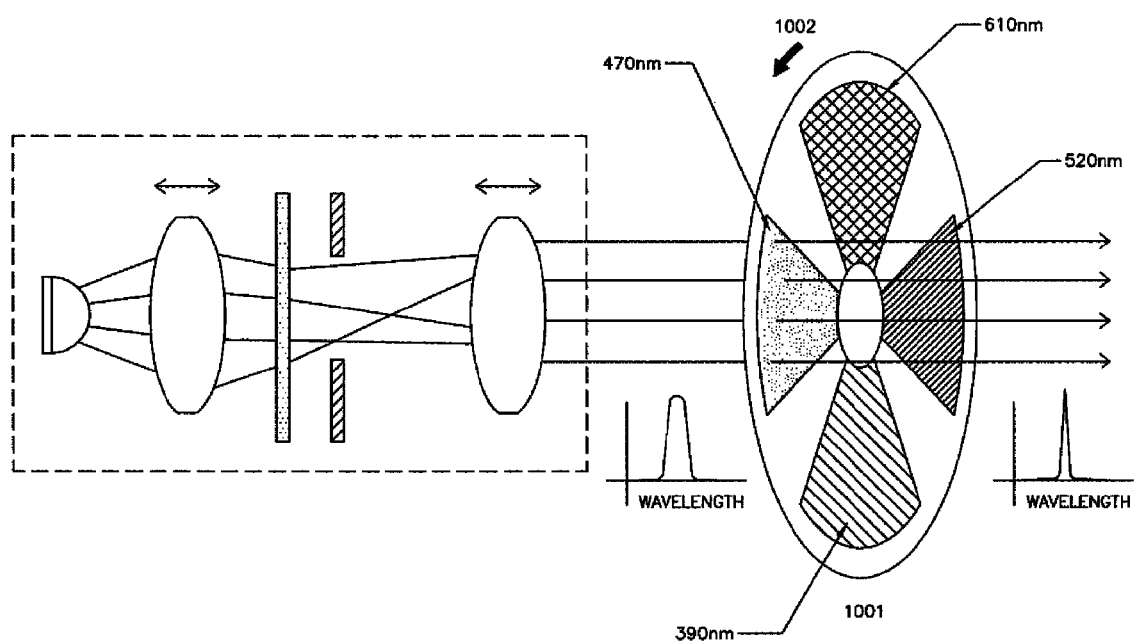
FIG. 10 is a representation of one embodiment that uses a narrow band pass filter wheel after the representation from FIG. 4 to further narrow the bandwidth of each color.

Aside from elements such as lenses and light scramblers which can reshape the size or spatial distribution of the light, other optical elements can be used to modify the spectral distribution of the light as well. Numerous fluorescence applications benefit from having exceptionally narrow bandwidths, so narrow band pass filters can be used to further reduce the spectral distribution of the LED chip(s). FIG. 10 illustrates one embodiment of the present invention that uses narrow band pass filters on a filter wheel. Current filter technology can reduce the bandwidth to be less than 1.0 nm. Since the filter does cut off some optical power, the choice of filters and whether or not to use them at all will depend on the users' preference between having a narrower bandwidth versus maximally intense light.

Figure 9A:
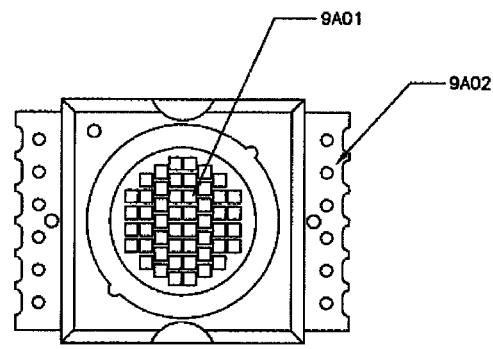
FIG. 9A is a representation of one embodiment of the densely packed multiple wavelength LED array used in the present invention, with 24 LED chips without individual packaging.
Figure 9B:
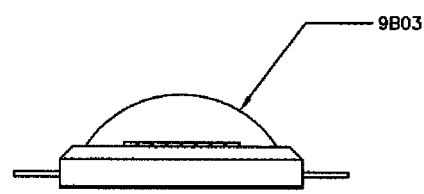
FIG. 9B shows a cross section of the densely packed multiple wavelength LED array from FIG. 9A.
Figure 9C:
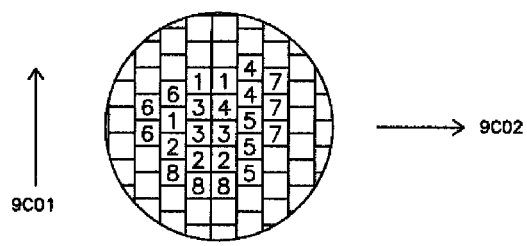
FIG. 9C is a representation of one configuration of LED array using 3 LED chips per channel (8 channels total).

The present invention includes a set of LED current driver circuits, and electronic control, as shown in FIG. 3. The purpose of the LED current drivers is to convert the DC voltage provided by the apparatus' AC-to-DC power supply, to a constant DC current for each of the strings of LED chips in the LED array. FIG. 9A is a representation of one embodiment of the densely packed multiple wavelength LED array used in the present invention, with 24 LED chips 9A01 without individual packaging and supported on a common substrate 9A02, such as a printed circuit board. FIG. 9B shows a cross section of the densely packed multiple wavelength LED array from FIG. 9A. FIG. 9C is a representation of one configuration of LED array in FIGS. 9A and 9B using 3 LED chips per channel (8 channels total). For example, with the LED array configuration of FIG. 9C, with eight wavelengths or colors emitted by 8 corresponding groups or strings of LED chips, configured three chips to a string where the 8 groups or strings of 3 LED chips each are labeled "1" to "8" in FIG. 9C, the apparatus would have eight LED current driver circuits, each feeding a constant DC current to one of the colors or wavelengths configured within the LED array. Thus, when used with the LED array configuration shown in FIG. 9C, each LED current driver circuit would be driving a string of three LED chips.

The light emitting area of the LED array in FIG. 9C is of diameter or cross dimension less than 25 mm, and is typically in the range of 8-15 mm. By moving the LED array in FIG. 9C along arrows 9C01 and/or 9C02, it is possible to selectively align some of the LED chips with the optical axis (not shown) to thereby select the desired wavelengths for the fluorescence microscope. With the above LED chip arrangements, the swapping-in of different wavelength LED "modules" is not needed, nor the use of dichroic mirrors and other beam-combining optics as in the prior art examples described above.

The electronic control circuitry shown in FIG. 3 performs several functions. The primary function of the electronic control is to turn on and off, as well as control the brightness, of each of the LED colors or wavelengths embodied in the LED array. This is done by directing the LED current driver circuits to either source a constant DC current, or to turn off the current flow. Brightness control of the LEDs is obtained by changing the value of the DC current that each LED current driver circuit provides.

As shown in FIG. 3, user input to the electronic control circuitry of the present invention can via a computer interface, or via manual user interface, or via both interfaces. In one embodiment, the computer interface is via a USB port. Software that is resident on a user's computer will send command messages via the USB interface, to the electronic control circuitry of the present invention. A microprocessor within the electronic control circuitry, running embedded software or firmware, will interpret the messages sent from the user's computer, in order to control the states of the illuminator apparatus. The manual user interface uses a combination of switches, knobs, and a dedicated display, to allow the user to select the color(s) or wavelength(s) of the illuminator apparatus, and the brightness of the LEDs, without requiring a separate computer.

Through the use of the USB interface, a separate computer can be used to turn on an off the individual wavelengths of the LED array at a rapid rate, limited only by the speed at which the processor within electronic control circuitry of the present invention is able to process the commands received over the USB interface. For even faster response, in the sub-microsecond range, one embodiment of the electronic control circuitry has direct digital and analog inputs, that can be used to directly turn on and off the selected wavelength's LED current driver circuit, or, alternatively, to directly set the brightness level of the selected wavelength. Switching from one wavelength to another wavelength is limited by the processing speed of the microprocessor within the electronic control circuitry. In the case of embodiments of the present invention which make use of lateral translation of the position of the LED array, in order to better optimize alignment of the selected wavelength with the optical axis of the apparatus, then the speed of switching between colors may be limited by the time required to laterally move or position the LED array.

Some fluorescent dyes may have fast decay times. It may be desirable to synchronize the emission of pulsed light with such decay times by controlling the current pulses supplied to the LED chips or strings of such chips. For example, the current pulses may be supplied at a frequency in excess of 100 Hz.

The various embodiments above have the following advantages:

All desired wavelengths or colors are present within a single LED array supported by a common substrate, so that the swapping-in of different wavelength LED "modules" is not needed, nor the use of dichroic mirrors and other beam-combining optics (as in the prior art examples).

A sophisticated optical design that makes use of the "extended point source" nature of the LED array to provide a bright beam of high uniformity across its width, in order to achieve consistent levels of fluorescence within the beam. Said optical design consisting of a light collecting lens of high numerical aperture, a light scramble/homogenizer, an aperture, and a focusing/collimating lens of relatively large aperture/diameter.

Use of a non-traditional, circular-pattern top-hat diffuser as the light scrambler/homogenizer element in one embodiment of the present invention, to further aid in the achieving of a uniform beam.

Although in many cases the LED array looks sufficiently like a point source, to achieve good spatial uniformity of light output, different embodiments of the present invention allow for lateral translation of the array's position, to more optimally align the illuminated portion (wavelength) of the array with the optical axis. (This same idea also applies to the embodiment which uses multiple arrays.)

Use of limited or narrow-bandwidth LEDs, instead of a broadband light source (e.g. a metal halide bulb), to waste less of the light output, and also to avoid the use of band-pass filters (either slide-in replaceable filter elements, or multiple wavelengths of filters on a mechanical "filter wheel" or "color wheel".

Notwithstanding the above claim about avoiding the use of filters, IF there is an application that demands an even narrower spectrum than what is provided naturally by the use of LED chips, it IS possible to use additional filters with the LED illuminator.

The specific optical configuration, including a half-ball lens for light extraction, a collector lens, a diffusing/scattering/homogenizing element, an aperture, and a beam focusing/collimating lens.

An additional embodiment that includes a mirror in the optical path to change the direction of the beam.

An embodiment that uses a light guide, optionally with embedded diffusing elements, to replace the diffuser and/or aperture of the primary embodiment. The effective "aperture" of the light guide is dependent on the geometry of the light guide itself, as well as its position, or distance from the collecting lens.

The adjustability of the position of both the collecting and focusing/collimating lenses of the primary embodiment, as a means of optimizing the optical performance of the apparatus when used with different brands of microscopes.

The use of electronic control circuitry to enable fast turn on and turn off of the selected wavelength/color. This includes both the commands that can be sent from a remote computer over the USB interface, as well as a "direct" interface that allows the ON/OFF state of the selected wavelength/color, and/or its brightness, to be directly controlled vie digital or analog inputs (achieved by bypassing the processor within the electronic control circuitry, and controlling the selected LED current driver directly).

Fast changing between different wavelengths/colors, gated by the speed of the electronic control circuitry, in the embodiments that don't require lateral translation or movement of the position of the LED array. This is due to the presence of all of the intended wavelengths/colors within a single LED array (instead of having separate colors in different LED modules).

While the invention has been described above by reference to various embodiments, it will be understood that changes and modifications may be made without departing from the scope of the invention, which is to be defined only by the appended claims and their equivalents.

We claim:

1. A LED array spot illuminator for providing light along an optical axis, comprising:
    a substrate;
    at least one array of multiple LED chips without individual packaging supported by said substrate, wherein the LED chips emit light within different wavelength ranges and are distributed laterally with respect to said axis over a light-emitting area, said LED chips having light emitting surfaces for emitting light in directions transverse to said area,
    an optical element adjacent to the light emitting surfaces of the LED chips in said at least one array and in the optical axis collecting light emitted by the LED chips;
    an optical device that collects and directs light emitted by the LED chips of the at least one array and collected by said optical element along the optical axis;
    an aperture located in the optical axis, wherein light collected by said optical element and said optical device and passed by the aperture forms a beam of light illuminating a spot; and
    a diffusing/scattering/homogenizing element in the optical axis to homogenize light within different wavelength ranges so that the beam illuminating the spot is substantially spectrally uniform across the surface of the illuminated spot.

2. The illuminator of claim 1, wherein the diffusing/scattering/homogenizing element is located between the at least one array of multiple LED chips and the aperture.

3. The illuminator of claim 1, wherein the dimensions of the light-emitting area do not exceed 25 mm.

4. The illuminator of claim 1, wherein the optical element and optical device are in the optical axis, said illuminator further comprising a device for adjusting positions along an optical axis of the optical element and optical device.

5. The illuminator of claim 1, further comprising a device for adjusting positions along an optical axis of the aperture and diffusing/scattering/homogenizing element.

6. The illuminator of claim 5, wherein the device adjusts positions along an optical axis of the optical device, the aperture and diffusing/scattering/homogenizing element simultaneously.

7. The illuminator of claim 1, wherein the optical element comprises a half-ball lens.

8. The illuminator of claim 1, further comprising a mirror or a light guide for directing the light from the optical element to the target.

9. The illuminator of claim 8, the light guide comprising embedded diffusing elements.

10. The illuminator of claim 1, further comprising an electronic control circuit for supplying electric current to the at least one array of multiple LED chips, and at least one interface for receiving computer or user commands for controlling the electric current supplied by the circuit to control light emission by the multiple LED chips.

* * * * *